United States Patent [19]
Valyi

[11] Patent Number: 6,159,402
[45] Date of Patent: Dec. 12, 2000

[54] PROCESS FOR FORMING A COLOR COATED ARTICLE

[76] Inventor: Emery I. Valyi, 102 Moseman Ave., Katonah, N.Y. 10536

[21] Appl. No.: 08/362,151

[22] Filed: Dec. 22, 1994

Related U.S. Application Data

[63] Continuation-in-part of application No. 08/112,980, Aug. 30, 1993, Pat. No. 5,401,457, which is a continuation of application No. 07/924,512, Aug. 4, 1992, abandoned.

[51] Int. Cl.[7] .................................................. B29C 45/16
[52] U.S. Cl. .......................... 264/153; 264/511; 264/513; 264/138; 264/265; 264/266
[58] Field of Search ..................... 264/265, 138, 264/266, 267, 163, 511, 513, 153, 132

[56] References Cited

U.S. PATENT DOCUMENTS

| | | | |
|---|---|---|---|
| 3,939,239 | 2/1976 | Valyi | 264/511 |
| 4,013,748 | 3/1977 | Valyi | 264/266 |
| 4,639,341 | 1/1987 | Hanamoto et al. | 264/511 |
| 4,802,295 | 2/1989 | Darr | 264/511 |
| 4,898,706 | 2/1990 | Yabe et al. | 264/132 |

FOREIGN PATENT DOCUMENTS

| | | | |
|---|---|---|---|
| 61-175025 | 8/1986 | Japan | 264/511 |
| 63-81021 | 4/1988 | Japan | 264/511 |
| 4-336225 | 11/1992 | Japan | 264/511 |

*Primary Examiner*—Jan H. Silbaugh
*Attorney, Agent, or Firm*—Bachman & LaPointe, P.C.

[57] ABSTRACT

A color coated article is formed by applying a color coated material to an injection mold having mold halves, a mold cavity edge and a mold cavity therein for the formation of an injection molded article, and injecting molten plastic into the mold cavity to form a laminated article with the color coated material bonded to the injected plastic. The process uses a color coated blank having a roughened surface, said blank adapted to be placed into at least one mold half and transferring the blank into registry with at least one of the mold halves. The molten plastic is injected against the roughened surface of the blank to enhance bonding of the blank to the injected plastic.

9 Claims, 3 Drawing Sheets

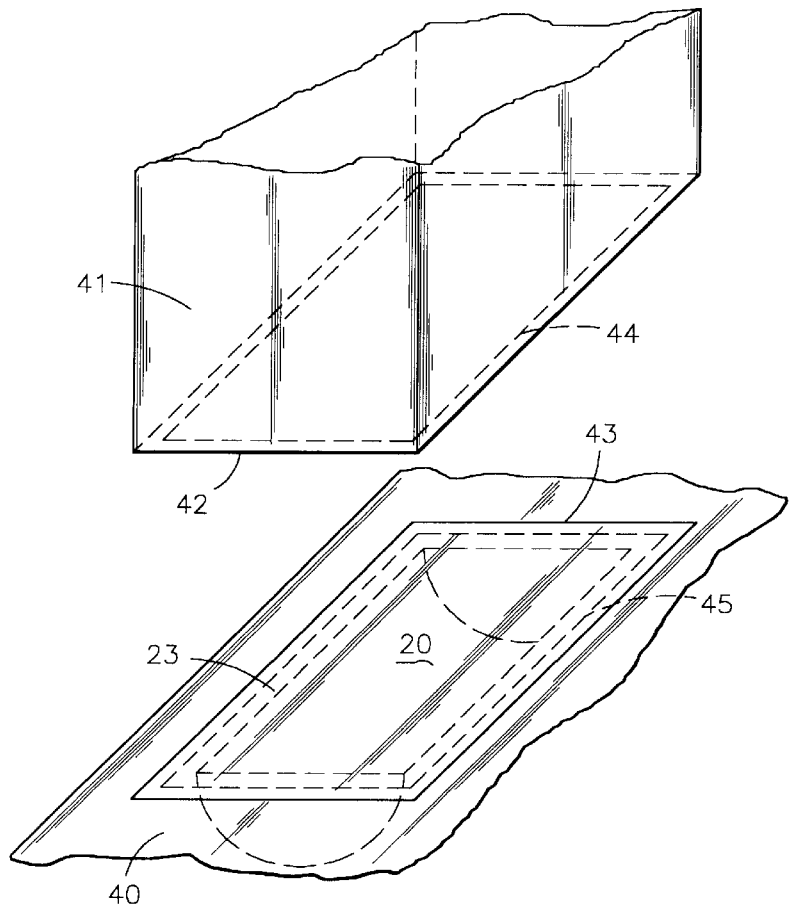
FIG-3
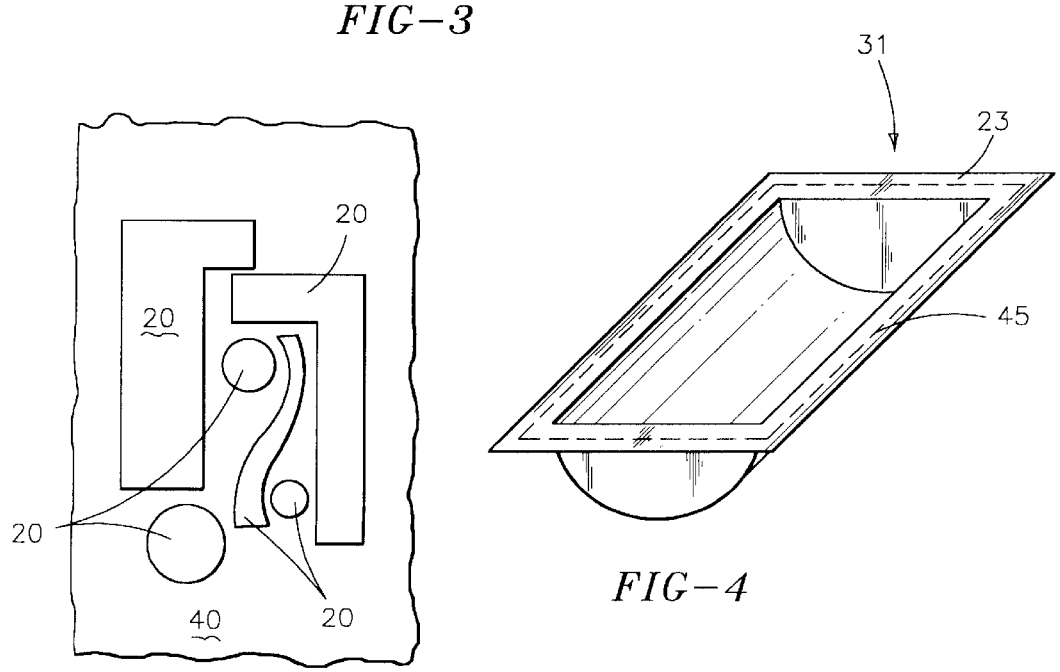
FIG-5
FIG-4

PROCESS FOR FORMING A COLOR COATED ARTICLE

CROSS-REFERENCE TO RELATED APPLICATIONS

This application is a continuation-in-part of U.S. patent application Ser. No. 08/112,980, filed Aug. 30, 1993, now U.S. Pat. No. 5,401,457, which in turn is a continuation of U.S. patent application Ser. No. 07/924,512, filed Aug. 4, 1992, now abandoned.

BACKGROUND OF THE INVENTION

In-mold coating involves the use of a film from which a shell is formed corresponding to the shape of one half a pressure mold, usually the cavity, by conventional thermoforming, or by using the pressure mold cavity itself as the thermoforming tool. If the latter, the film may be preheated and formed in that cavity, with the formed shell juxtaposed with the other mold half, to form a plastic molded part therein. Alternately, the film may be clamped against one parting face of a pressure mold and the plastic molded against it, whereby the latter softens the film and forces it into the cavity of course, the film may also be preheated before the pressure molding step.

Whichever procedure is followed, a laminated pressure molded plastic article is formed with a skin consisting of the film. The skin may be colored or decorated to provide a decorated or color coated article.

It is highly desirable to provide an improved process for forming a color coated article of the aforesaid type. The cost of the film and the process of introducing it into the pressure mold represent major parts of the total cost of applying a finish to the pressure molded article in the foregoing procedure.

Further, as described above, the shell is formed by thermoforming, whether in a separate mold, or in the pressure molding cavity. Thus, it is drawn from a sheet that is typically large enough to accommodate the formation of several shells at the same time, meaning that several thermoforming mold cavities must be placed in juxtaposition with the sheet. This, in turn, leaves spaces between the cavities covered by film stock not used to make shells and is thus wasted. The shells so formed are then punched out of one sheet, to be placed into the pressure molding cavities, and the rest of the expensive sheet, the so-called "skeleton scrap", is discarded.

When the shell is formed in the pressure molding cavities of multi-impression molds, the amount of skeleton scrap is greater than for thermoforming done separately, because the spacing of cavities in thermoforming is closer than in pressure molding of molten plastic.

With separately thermoformed shells, an additional problem arises when attempting to place the shells into the pressure molding cavity accurately enough to avoid folds and other defects due to the pressure molding step.

In addition, when the plastic is molded against the film, it is desirable to obtain a good bond between the molded plastic and the film without the added expense and inconvenience of bonding aids and the like in order to avoid unbonded sites and even delamination. This may represent a significant problem.

Accordingly, it is a principal object of the present invention to provide an improved process for forming a color coated article using in-mold coating.

It is a further object of the present invention to provide an improved process as aforesaid which minimizes scrap formation and defects in processing.

It is a still further object of the present invention to provide a process as aforesaid which is economical and easy to use.

It is a further object of the present invention to provide a process as aforesaid which obtains a good bond between the molded plastic and the film without the necessity for expensive and inconvenient bonding aids and the like.

Further objects and advantages of the present invention will appear hereinbelow.

SUMMARY OF THE INVENTION

In accordance with the present invention, the foregoing objects and advantages are readily obtained.

The process of the present invention forms a color coated article by applying a color coated material to an injection mold having mold halves, a mold parting face, a mold cavity edge, and a mold cavity therein for the formation of an injection molded article, and injecting molten plastic into said mold cavity to form a laminated article with the color coated material bonded to the injected plastic. The improvement of the present invention comprises: providing a color coated blank having a roughened surface, said blank adapted to be placed into at least one mold half; transferring said blank into registry with at least one of said mold halves; and injecting molten plastic into the mold cavity against the roughened surface of the blank to form a laminated, injection molded article with the color coated blank bonded to the injected plastic, wherein the roughened surface of the blank enhances bonding of the blank to the injected plastic.

An embodiment of the present invention comprises, a process for forming a color coated or decorated article is provided by applying a color coated material to an injection mold having mold halves, a mold parting face, mold cavity edge and a mold cavity therein for the formation of an injection molded article, and injecting molten plastic into said mold cavity to form a laminated article with the color coated material bonded to the injected plastic, with the improvement of the present invention comprising: cutting a color coated blank from a web in a size and shape adapted to fit between the mold halves and with a rim portion thereof adapted to mate with the mold cavity edge at the parting face of the mold; providing at least one surface of the blank with portions thereof which extend beyond the surface of the blank; transferring the blank into registry with at least one of the mold halves and retaining the rim portion thereof on the mold cavity edge; and injecting molten plastic into the mold cavity against the portions of the blank which extend beyond the surface of the blank to form a laminated, injection molded article with the color coated blank bonded to the injected plastic, wherein the portions of the blank which extend beyond the surface of the blank enhance bonding of the blank to the injected plastic.

At least one surface of the blank is desirably provided with roughening by means of at least one of, for example, ridges, dimples and a plurality of discrete embossments on the surface thereof. The blank is desirably a planar blank, wherein the roughened portions thereof are bonding enhancement portions which extend beyond the plane of the blank. The roughened portions of the blank increase the surface area of the blank and promote greater adherence between the blank and injected plastic, i.e., greater force is required to pull the components apart.

Desirably, the process of the present invention includes the steps of deforming the blank to conform to said at least one mold half and closing the mold halves to form a mold cavity, although the present invention can readily use a preshaped blank, as by shaping by thermoforming, injection molding or any desired procedure. The injection mold includes a mold core and the blank may be deformed at least in part by the mold core. The color coated blank can be color coated over the entire surface or provided with a color coating over part of the surface, as desired.

The rim portion of the blank may be retained on the mold cavity edge if desired, as by suction or mechanical means, and the blank deformed under pressure or by a mold core.

The blank is preferably cut by stamping and the rim portion of the blank preferably scored for convenience of subsequent trimming. The stamping and scoring may be conveniently performed at the same time in a single operation.

The blank is preferably transferred by a holding means and is preferably pre-heated before deforming, wherein the pre-heating may be performed by the holding means.

Other features and advantages of the present invention will appear hereinbelow.

BRIEF DESCRIPTION OF THE DRAWINGS

The present invention will be more readily understood from a consideration of the accompanying illustrative drawings, in which:

FIG. 3 is a perspective view of a web with a blank cut therefrom;

FIG. 4 is a perspective view of an article formed in the process of the present invention;

FIG. 5 is a top view of a web showing the formation of different size blanks;

DETAILED DESCRIPTION

Figure 1:
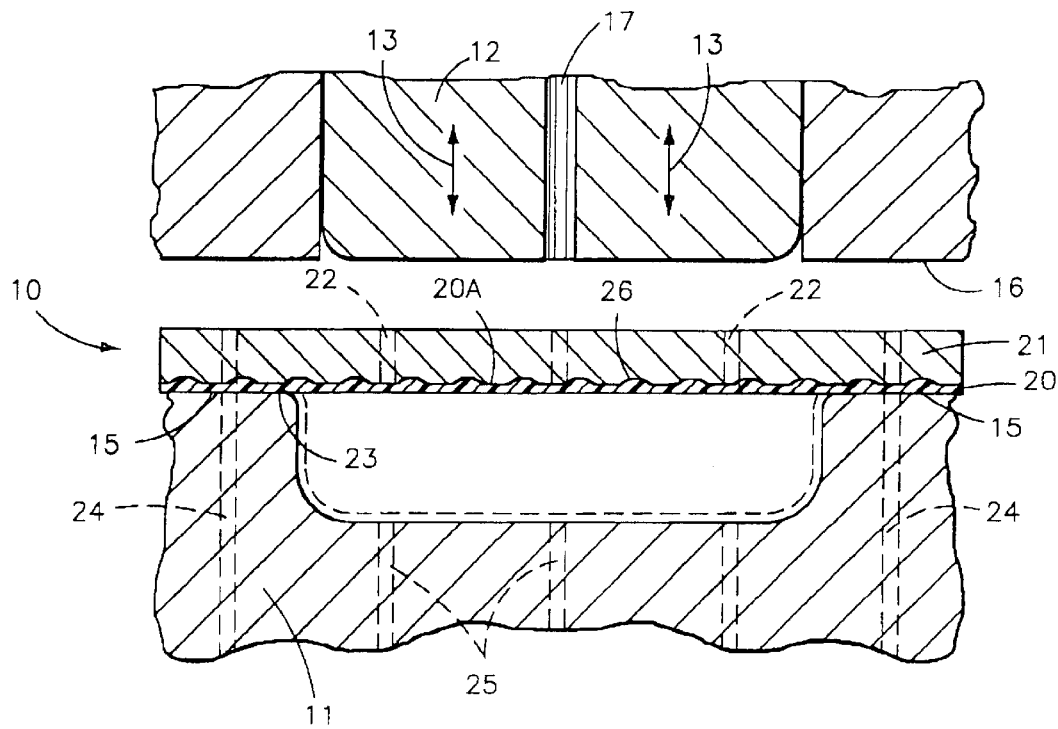
FIG. 1 is a partly schematic sectional view of the process of the present invention with the mold halves spaced apart and the blank positioned in registry therewith.
Figure 2:
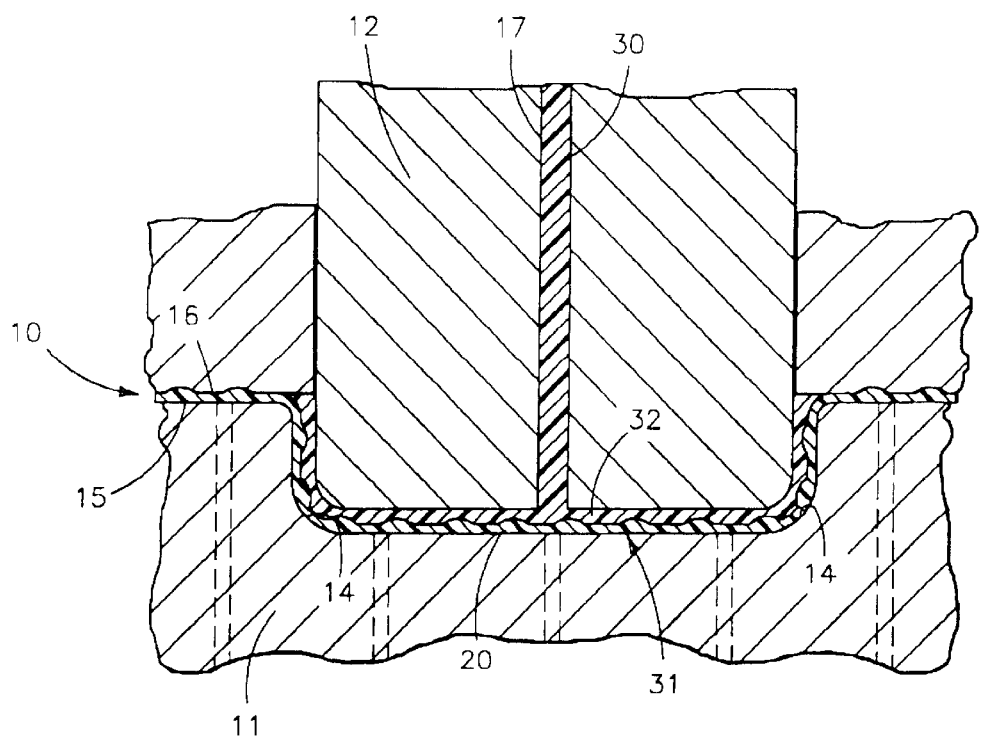
FIG. 2 is a view similar to FIG. 1 with the mold halves closed to form a mold cavity and the laminated article formed therein.

Referring to FIGS. 1 and 2, injection mold 10 is provided with a mold cavity half 11 and core mold half 12. Core 12 is movable in the direction of arrows 13 towards and away from mold half 11 by suitable motive means (not shown) to form mold cavity 14 between the mold halves as clearly shown in FIG. 2. At their parting face, mold half 11 has a mold edge 15 adjacent mold cavity 14, and core 12 has a corresponding core mold edge or hold down rim 16 movable towards and away from mold edge 15 in the direction of arrows 13. Core 12 is provided with at least one injection sprue 17 connected to a source of molten plastic (not shown) for injection of molten plastic into mold cavity 14 when the mold 10 is in the mold closed position shown in FIG. 2.

A color coated blank 20 is transferred between the mold halves into registry with at least one of the mold halves by transfer plate 21 which acts as a holding means for the blank via suction channels 22 connected to a source of suction (not shown).

At least one surface 20A of blank 20 is provided with roughened portions thereof which extend beyond surface 20A of the blank, as embossments 26 which extend beyond the plane of the generally planar blank 20.

Blank 20 has a rim portion 23 which engages mold edge 15 and is held in conformance therewith via mold edge suction channels 24 also connected to a source of suction (not shown). Blank 20 is then deformed into conformity with mold 11 as by mold suction channels 25 which are also connected to a source of suction (not shown). The blank 20 is released from transfer plate 21 aided by discontinuance of suction from channels 22 or if desired by use of positive pressure through channels 22. Also, if desired mold core 12 can accomplish the deformation of blank 20 into conformity with mold 11 (or aid in said deformation), naturally after removal of plate 21 from between the mold halves. Naturally, a preshaped blank may be used which fits into the mold cavity so that no deformation of the blank may be necessary.

After removal of plate 21 from between the mold halves, the mold halves are closed by moving core 12 and core mold edge 16 in the direction of arrows 13 into the position shown in FIG. 2 using any desired motive means. If a flat blank is used as shown in FIG. 1, the core mold edge 16 engages blank rim portion 23 as shown in FIG. 2 and serves as a mechanical means for holding blank edge portion in conformity with mold edge 15. The blank may also be held in place during pressure molding by other means if desired, as by a hold-down rim.

Alternatively, hold down rim 16 is independently movable and after removal of plate 21 is in constant contact with the blank to hold same in place while the mold is closed. If so constructed, the core is in a fixed position while the cavity half of the mold closes against the core.

Molten plastic 30 is then injected into mold cavity 14 via sprue 17 to form a laminated injection molded article 31 with the color coated blank 20 bonded to the injected plastic 32. The molten injected plastic will locally melt the blank to promote bonding, but bonding aids e.g., adhesives, may be used on the blank if desired.

Those roughened portions of blank 20, as embossments 26, serve to enhance bonding of the blank to the injected plastic without the necessity for bonding aids, as adhesive layers, although of course these may also be used if desired. Thus, the roughened portions of the blank are bonding enhancement portions which increase the surface area of the blank and promote greater adhesion between the blank and the injected plastic. The resultant product has a better bond between the blank and the injected plastic so that more force is required to pull the components apart. Moreover, the embossments or the like do not affect the esthetics of the final product since they represent a plurality of discrete embossments or the like.

FIG. 3 shows web 40 with blank 20 cut therein by stamping tool 41. Thus, instead of punching out a formed shell, substantially flat blank 20 is stamped from web 40 via tool 41, having the size and contour of the projected area and shape of the pressure molding cavity 14 (schematically shown in dashed lines in FIG. 3), plus a blank rim portion 23 to form a holding surface between mold halves as shown in FIGS. 1 and 2. Stamping tool 41 is provided with cutting edge 42 to cut the blank at cut line 43 and scoring means 44 to score blank rim portion 23 at score line 45, which corresponds to the mold cavity edge. Scoring means 44 is schematically indicated in dashed lines on stamping tool 41 to show where the scoring edge thereof cuts into the web to form a notch. As shown in FIGS. 1 and 2, blank 20 is placed into registry with at least one of the mold halves to cover the mold face and the blank rim 23 retained on the mold edge while the blank is deformed and the final article formed. Finished article 31 is now obtained as shown in FIG. 4 with blank rim 23 protruding therefrom and which may be removed by tearing at score line 45 by hand or by mechanical means. Alternatively, one may omit the score line and simply remove the rim by any desired means, as by cutting.

Stamping blanks 20 from web 40 allows much closer spacing than thermoforming, let alone pressure molding, and the amount of skeleton scrap is reduced accordingly. Moreover, the layout of blanks 20 on web 40 may be closely packed, according to the geometry thereof, as in the case of differently shaped blanks being stamped from the same sheet at the same time, in which case they may be nested to leave the least space therebetween, as shown in the schematic illustration in FIG. 5.

If desired, for economy, the rim portion of the blank may be left uncolored or undecorated in the areas where it is to be subsequently removed.

Figures 6A, 6B, 7A, 7B:
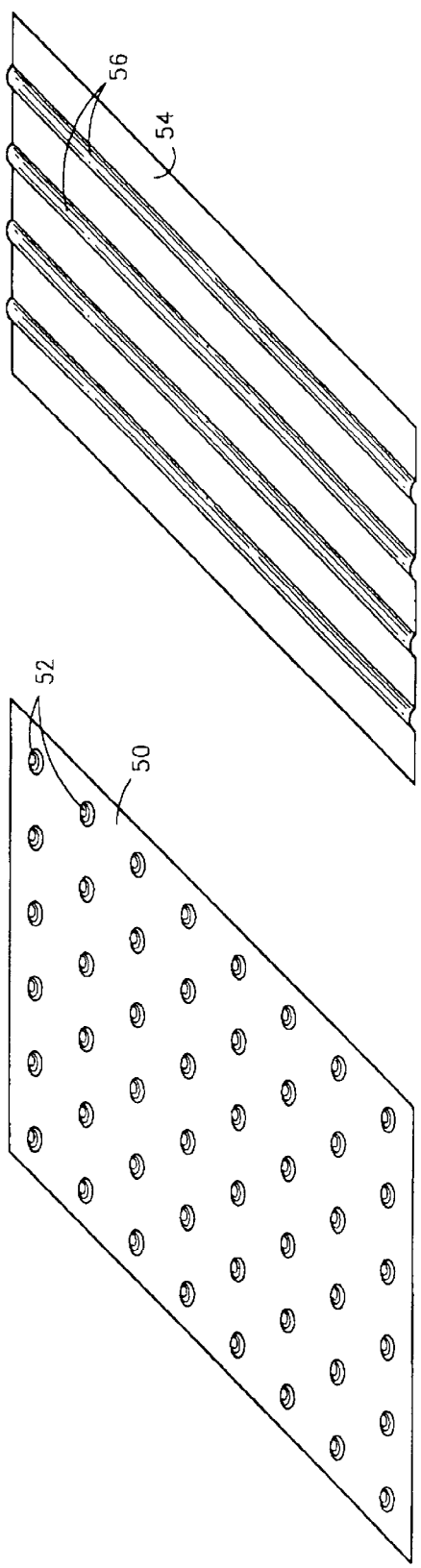
FIG. 6A is a perspective view of a blank including a plurality of discrete embossments thereon.
FIG. 6B is a side view of the blank of FIG. 6A.
FIG. 7A is a perspective view of a blank including a plurality of ridges thereon.
FIG. 7B is a side view of the blank of FIG. 7A.

The roughened portions of the blank may, for example, be a plurality of discrete dimples, embossments or protrusions, or continuous ridges. FIGS. 6A and 6B show blank 50 including a plurality of discrete embossments or dimples 52, and FIGS. 7A and 7B show blank 54 including continuous ridges 56. The ridges or embossments may conveniently be formed on a roll of film, as by embossing the roll in a continuous manner, to form the desired configuration prior to cutting the blank. Alternatively, if desired, the blanks may be pre-cut and the embossments or the like formed thereafter. The embossments or the like do not interfere with transferring the blank or with heating the blank or with further processing.

Alternatively, if desired, the process of the present invention may be used to form a multi-planar article as, for example, by first holding a first edge portion of the blank against a first edge portion of a mold cavity half in a first plane, followed by deforming a second edge portion of the blank against a second edge portion of a mold cavity half in a second plane.

The blank may conveniently be preheated at least in part before deforming, and the preheating may be performed at least in part by a holding means which transfers the blank.

It is to be understood that the invention is not limited to the illustrations described and shown herein, which are deemed to be merely illustrative of the best modes of carrying out the invention, and which are susceptible of modification of form, size, arrangement of parts and details of operation. The invention rather is intended to encompass all such modifications which are within its spirit and scope as defined by the claims.

What is claimed is:

1. In a process for forming a color coated article by applying a color coated material to an injection mold having mold halves, a mold parting face, a mold cavity edge, and a mold cavity therein for the formation of an injection molded article, and injecting molten plastic into said mold cavity to form a laminated article with the color coated material bonded to the injected plastic, the improvement which comprises:

providing a color coated blank having a roughened surface, said blank adapted to be placed into at least one mold half, wherein the color coated blank is cut from a web in a size and shape adapted to fit between the mold halves, and with a rim portion thereof adapted to mate with the mold cavity edge at the parting face of the mold;

transferring said blank into registry with at least one of said mold halves, including the step of retaining the rim portion on the mold cavity edge; and injecting molten plastic into the mold cavity against the roughened surface of the blank to form a laminated, injection molded article with the color coated blank bonded to the injected plastic, wherein the roughened surface of the blank increases the surface area of the blank, promotes greater adherence between the blank and injected plastic and enhances bonding of the blank to the injected plastic.

2. Process according to claim 1, wherein at least one surface of the blank is roughened by means of at least one of a plurality of embossments, a plurality of dimples, and a plurality of ridges.

3. Process according to claim 1, wherein the blank is a planar blank and wherein the roughened portions extend beyond the plane of the blank.

4. Process according to claim 1, including the step of providing at least one surface of the blank which extends beyond the surface of the blank.

5. Process according to claim 4, including the step of deforming the blank to conform to said at least one mold half and closing the mold halves to form a mold cavity.

6. Process according to claim 4, wherein the injection mold includes a mold core and wherein the blank is deformed at least in part by the mold core.

7. Process according to claim 4 including the step of transferring the color coated blank into registry with at least one of the mold halves by a transfer means independent of said mold halves which acts as a holding means for the blank.

8. Process according to claim 7 wherein the blank is retained on the holding means during transfer, including the step of releasing the blank from the holding means and removing the holding means from the blank.

9. Process according to claim 8 wherein said transfer means is a transfer plate which includes suction channels for holding the blank on the transfer plate.

* * * * *